(12) United States Patent
Masuki

(10) Patent No.: US 7,321,472 B2
(45) Date of Patent: Jan. 22, 2008

(54) OPTICAL APPARATUS SUCH AS DIGITAL STILL CAMERA, VIDEO CAMERA, AND INTERCHANGEABLE LENS

(75) Inventor: Akihiko Masuki, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 88 days.

(21) Appl. No.: 11/353,695

(22) Filed: Feb. 14, 2006

(65) Prior Publication Data

US 2006/0181783 A1 Aug. 17, 2006

(30) Foreign Application Priority Data

Feb. 16, 2005 (JP) .............................. 2005-039715

(51) Int. Cl.
*G02B 15/14* (2006.01)
(52) U.S. Cl. ....................................... 359/704; 359/694
(58) Field of Classification Search ................. 359/704
See application file for complete search history.

(56) References Cited

U.S. PATENT DOCUMENTS 6,606,206 B2 8/2003 Takeshita et al. ........... 359/704

2002/0044363 A1* 4/2002 Takeshita et al. ........... 359/819

FOREIGN PATENT DOCUMENTS

JP 10-031149 2/1998
JP 2001-324663 11/2001

* cited by examiner

*Primary Examiner*—Jordan Schwartz
*Assistant Examiner*—James C Jones
(74) *Attorney, Agent, or Firm*—Cowan, Liebowitz & Latman, P.C.

(57) ABSTRACT

An optical apparatus having a first member and a second member rotating about an optical axis with respect to the first member. One of the members has a cam portion; the other has a cam follower portion engaged with the cam portion which drives the first and second members relatively in an optical axis direction. The first member has first and second portions protruding toward the second member side separated from each other in the optical axis direction; the second member has third and fourth portions protruding toward the first member side separated from each other in the optical axis direction and abuts on the first and second portions, respectively; and the fourth portions are provided in a circumferential direction of the second member and include protruding portions for transmitting power.

10 Claims, 13 Drawing Sheets

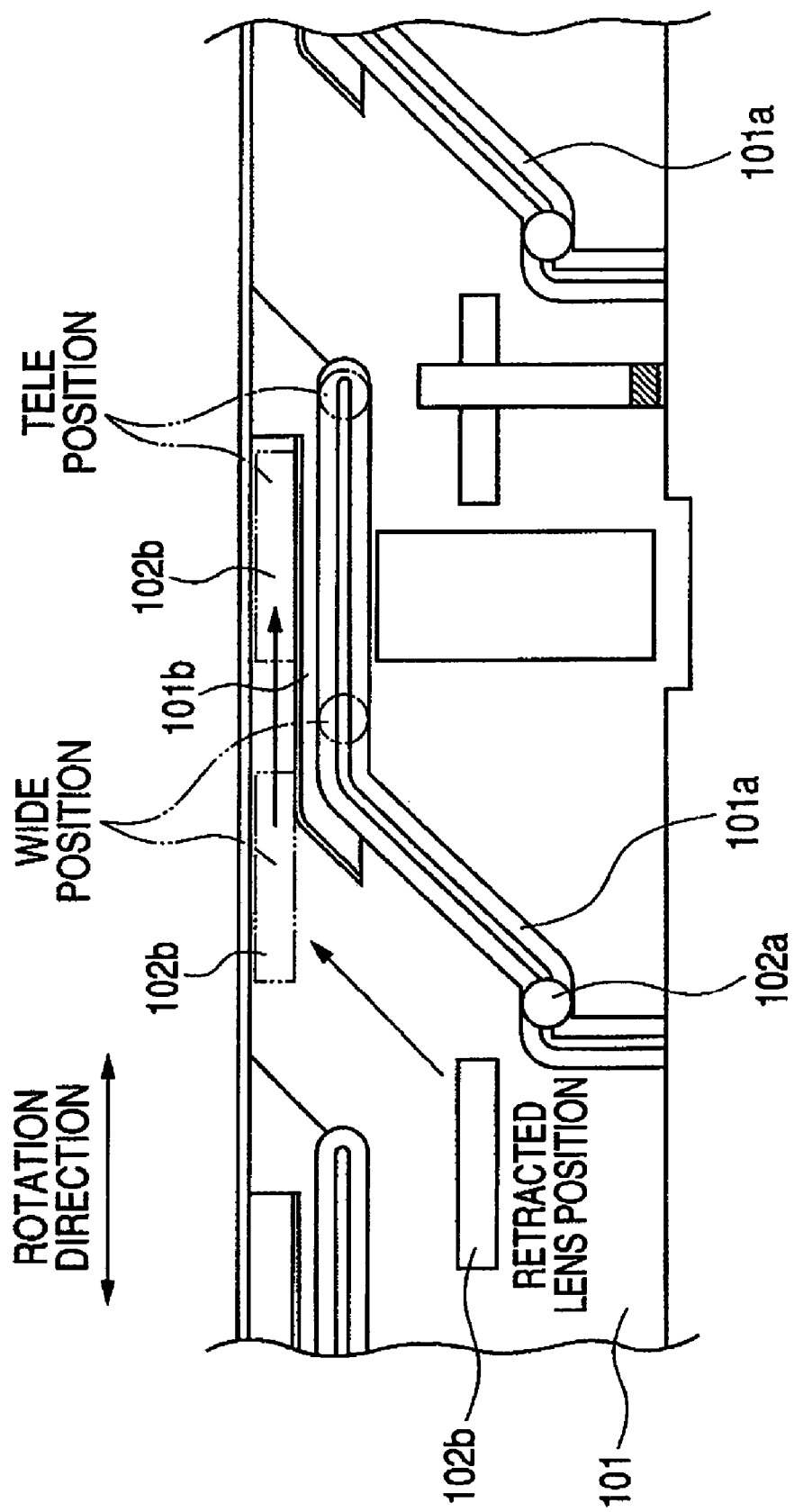

OPTICAL APPARATUS SUCH AS DIGITAL STILL CAMERA, VIDEO CAMERA, AND INTERCHANGEABLE LENS

BACKGROUND OF THE INVENTION

1. Field of the Invention

The present invention relates to an optical apparatus such as a digital still camera, a video camera, and an interchangeable lens, and more particularly, to a structure for preventing a cam engaging portion for driving a lens barrel of the optical apparatus from being disengaged when an external force is applied to the lens barrel.

2. Related Background Art

In one basic construction of a lens barrel that expands and contracts in an optical axis direction, a cam follower portion provided on a cam barrel for cam-driving a lens holding barrel for holding a lens is engaged with a cam groove portion provided in a fixed barrel, and the cam barrel rotates around the optical axis and is thereby driven in the optical axis direction, so the lens holding barrel is also driven in the optical axis direction.

In the lens barrel described above, when an external force is applied to a front end of the lens barrel, for example, when the optical apparatus is dropped, the cam follower portion may be disengaged from the cam groove portion to make it impossible to drive the lens barrel.

In view of the foregoing circumstances, an optical apparatus disclosed in Japanese Patent Application Laid-Open No. 2001-324663 (paragraphs 0031 to 0032, FIG. 10, and the like) proposes a structure that protruding portions provided on a fixed barrel and protruding portions provided on a cam barrel are brought into abutment on each other, so a cam follower portion is prevented from being disengaged from a cam groove portion even when an external force is applied thereto.

FIG. 13 is a developed view of an external force absorbing structure, around an optical axis, of the optical apparatus proposed in Japanese Patent Application Laid-Open No. 2001-324663 (paragraphs 0031 to 0032, FIG. 10, and the like). Referring to FIG. 13, a cam groove portion 101a is formed in an inner peripheral surface of a fixed barrel 101. A cam follower 102a, which is provided on an outer peripheral surface of a cam barrel (not shown) provided inside the fixed barrel 101, is engaged with the cam groove portion 101a. With this construction, when the cam barrel rotates in a direction indicated by an arrow of FIG. 13, the cam follower 102a moves along the cam groove portion 101a. Therefore, the cam barrel is driven in the optical axis direction with respect to the fixed barrel 101.

Protruding portions 101b are provided on an object side with respect to the cam groove portion 101a in the inner peripheral surface of the fixed barrel 101. Protruding portions 102b are provided on an outer peripheral surface of the cam barrel. When the cam barrel moves from a retracted lens position toward the object with respect to the fixed barrel 101, the protruding portions 102b move toward the object together with the cam barrel so as not to interfere with the protruding portions 101b of the fixed barrel 101. When the cam barrel is in a zoom region between a wide position and a tele position after having moved toward the object with respect to the fixed barrel 101, the protruding portions 102b is located on the object side with respect to the protruding portions 101b of the fixed barrel 101. When an external force is applied from the object side in this state, the protruding portions 102b comes into abutment on the protruding portions 101b, so the cam follower 102a is prevented from being disengaged from the cam groove portion 101a.

A lens holding barrel disclosed in Japanese Patent Application Laid-Open No. H10-031149 (paragraphs 0028 to 0029, FIG. 2, and the like) proposes a configuration in which, when an external force is applied to the lens holding barrel, a contact portion provided on the lens holding barrel at an end in the optical axis direction thereof comes into abutment on a cam face of a cam groove portion. A cam follower portion is thereby prevented from being disengaged from the cam groove portion.

However, in the optical apparatus proposed in Japanese Patent Application Laid-Open No. 2001-324663 (paragraphs 0031 to 0032, FIG. 10, and the like), it is impossible to ensure a sufficient circumferential length allowing the protruding portions 102b on the cam barrel to abut on the protruding portions 101b on the fixed barrel 101 (hereinafter referred to as abutment length) in the vicinity of the wide position in the zoom region. This causes a problem in that the vicinity of the wide position is weak in strength against an external force in comparison with the other portions in the zoom region.

When an attempt is made to increase the circumferential length of the protruding portions 102b on the cam barrel to increase the abutment length for abutment on the protruding portions 101b of the fixed barrel 101 in the vicinity of the wide position, the protruding portions 102b interferes with the protruding portions 101b when the cam barrel is driven between the retracted lens position and a position on the object side. Alternatively, it is also conceivable to adopt a method of rotating the cam barrel by a larger angle before its arrival at the wide position after its movement from the retracted lens position toward the object side so as to increase the abutment length of both the protruding portions 102b and 101b in the vicinity of the wide position. In this method, however, the entire circumferential length of the cam groove portion 101a is increased, which leads to the necessity of increasing the diameters of the cam barrel and the fixed barrel. As a result, any effort to reduce the size of the optical apparatus is hampered.

SUMMARY OF THE INVENTION

The present invention has been made in consideration of the above situation, and it is an object of the present invention to provide an optical apparatus whose strength against an external force can be uniformized or enhanced without increasing the size of a lens barrel.

According to the present invention, the foregoing object is attained by providing an optical apparatus including: a first member; and a second member for rotating around an optical axis with respect to the first member, in which: one of the first member and the second member has a cam portion; the other of the first member and the second member has a cam follower portion for being engaged with the cam portion; the cam portion drives the first member and the second member relatively to each other in an optical axis direction through relative rotation of the first member and the second member; the first member has first protruding portions and second protruding portions which protrude toward the second member side at positions separate from each other in the optical axis direction; the second member has third protruding portions and fourth protruding portions which protrude toward the first member side at positions separate from one another in the optical axis direction and can abut on the first protruding portions and the second protruding portions in the optical axis direction, respectively; and the fourth protruding portions are provided in a circumferential direction of the second member and include protruding portions for transmitting a power.

The foregoing object is also attained by providing an optical apparatus including: a first member; and a second member for rotating around an optical axis with respect to the first member, in which: one of the first member and the second member has a cam portion; another of the first member and the second member has a cam follower portion for being engaged with the cam portion; the cam portion drives the first member and the second member relatively to each other in the optical axis direction through relative rotation of the first member and the second member; the first member is provided with protruding portions for the first member which protrudes toward the second member side; the second member is provided with a plurality of protruding portions for the second member which protrude toward the first member side and can abut on the protruding portions for the first member from the optical axis direction; and the protruding portions for the second member are provided in a circumferential direction of the second member and include protruding portions for transmitting power.

The above and other objects, features, and advantages of the invention will become more apparent from the following detailed description taken in conjunction with the accompanying drawings.

BRIEF DESCRIPTION OF THE DRAWINGS

In the accompanying drawings:

FIG. 13 is a developed view of a conventional structure for receiving an external force around an optical axis.

DESCRIPTION OF PREFERRED EMBODIMENT

The present invention will now be described in detail below with reference to the drawings showing preferred embodiments thereof.

Figure 9:
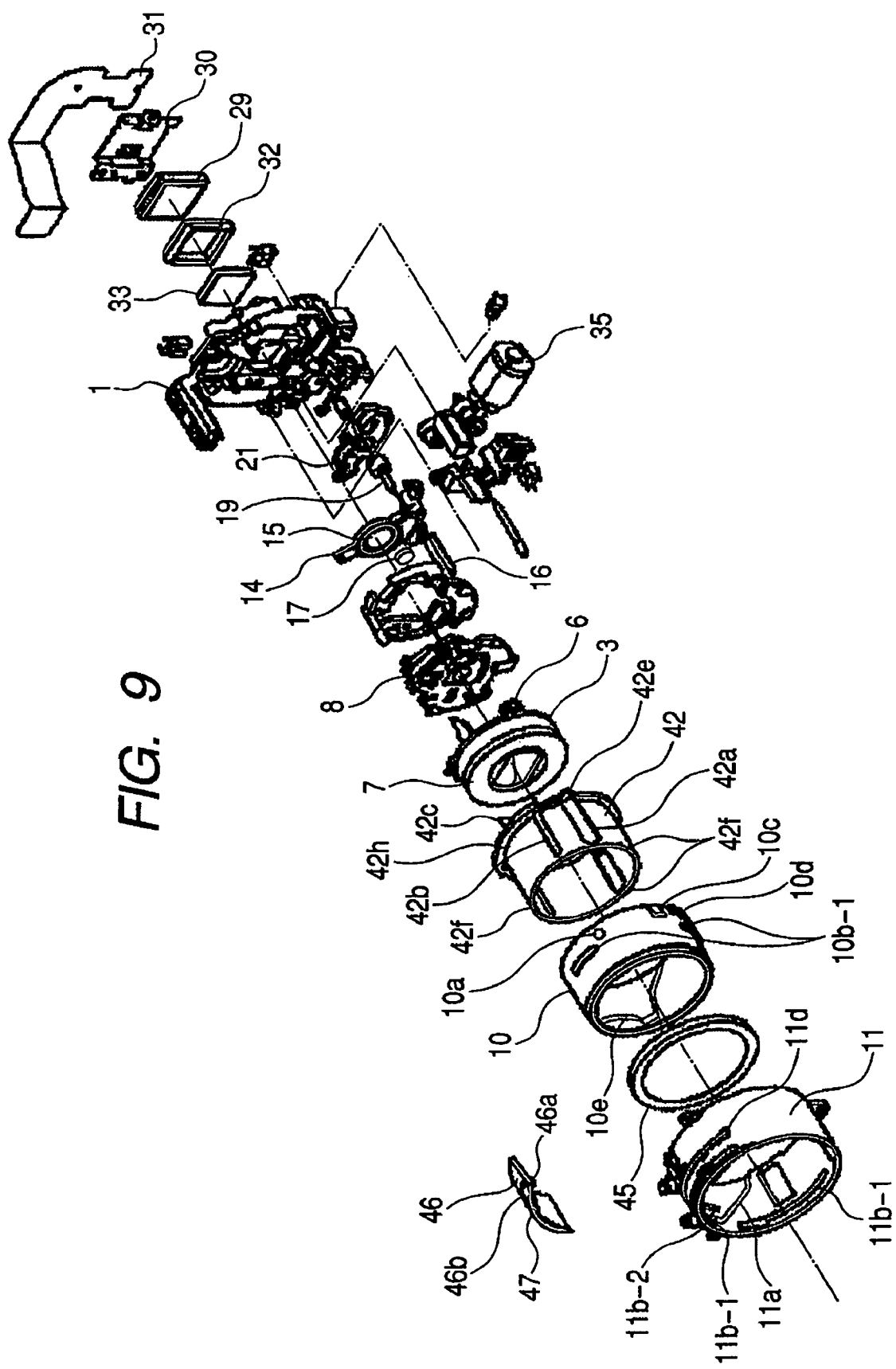
FIG. 9 is an exploded perspective view of the lens barrel unit according to the embodiment of the present invention.
Figure 10:
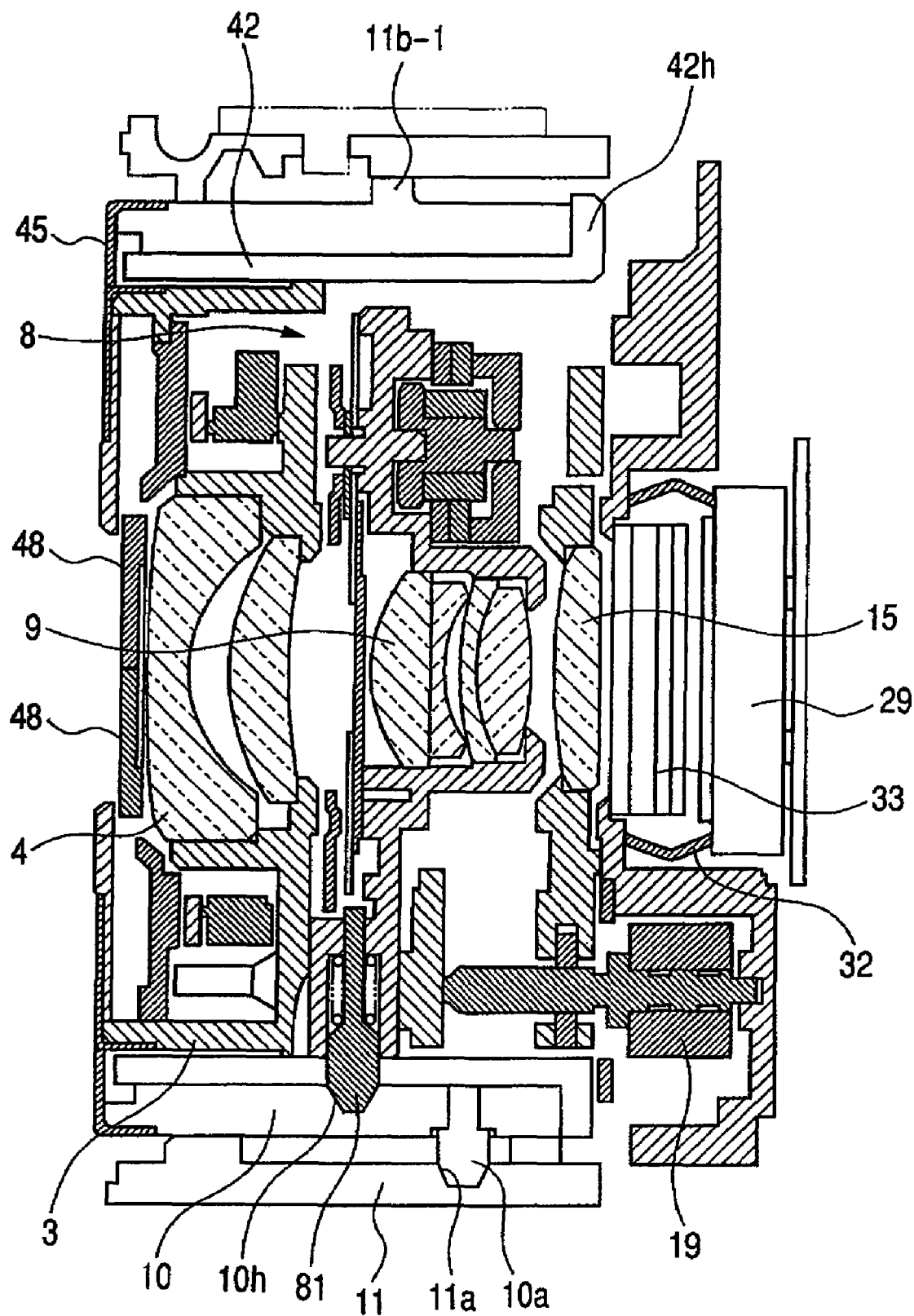
FIG. 10 is a sectional view of the digital still camera according to the embodiment of the present invention (in a retracted lens state)
Figure 11:
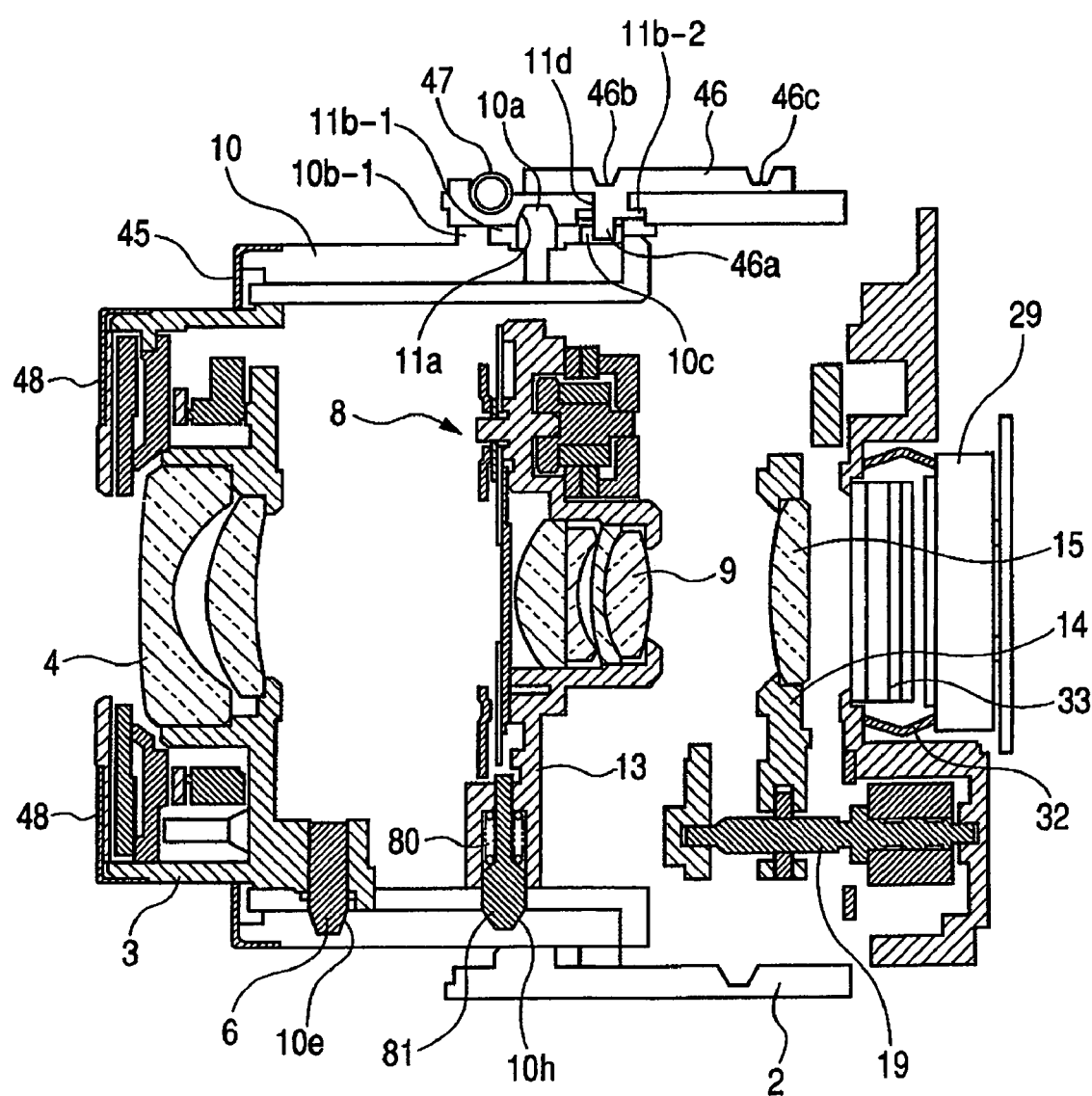
FIG. 11 is a sectional view of the digital still camera according to the embodiment of the present invention (in the wide state)
Figure 12:
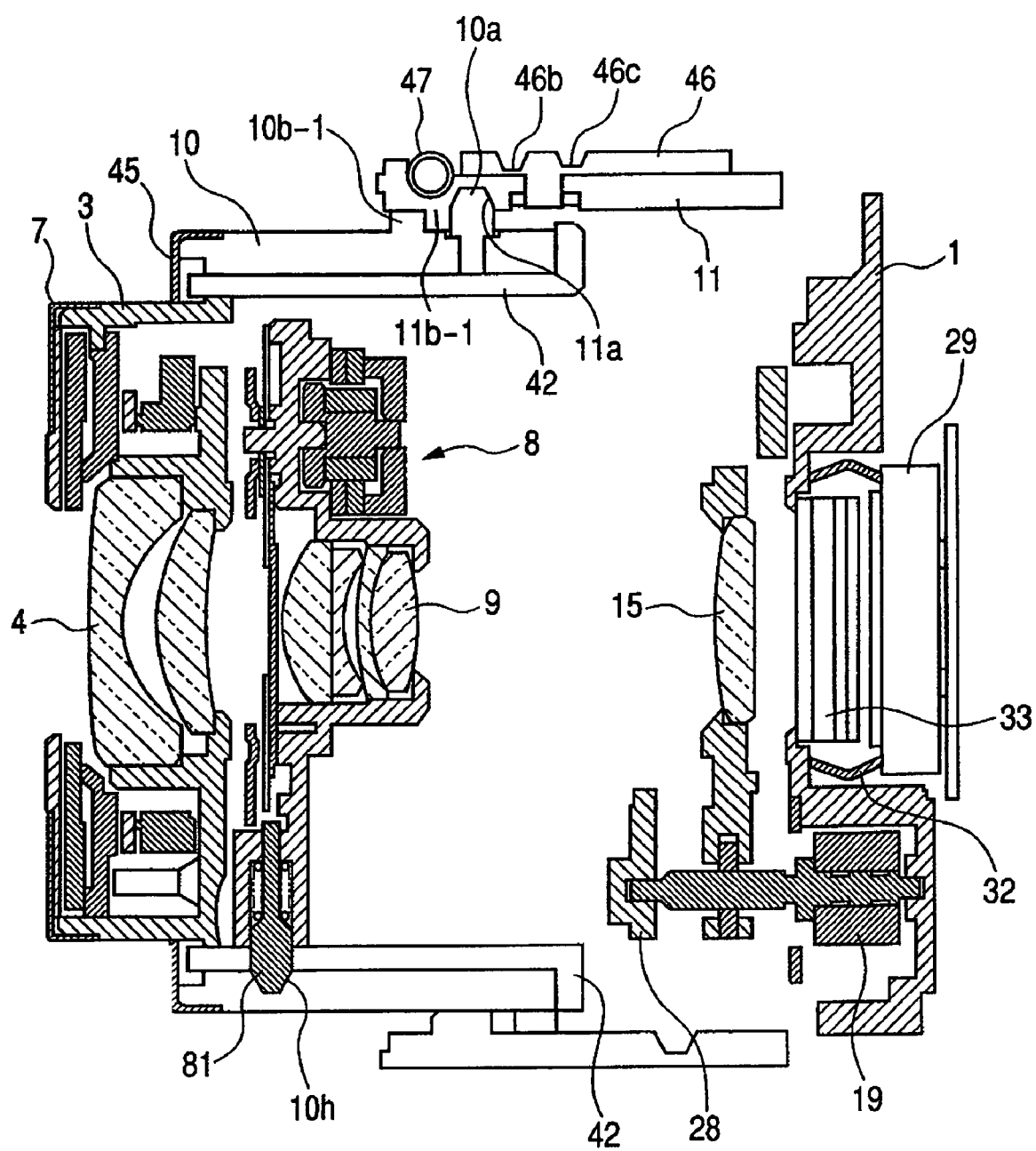
FIG. 12 is a sectional view of the digital still camera according to the embodiment of the present invention (in the tele state)

FIGS. 9 to 12 each show a construction of a digital still camera (a photographic apparatus or an optical apparatus) according to the embodiment of the present invention. FIG. 9 is an exploded perspective view showing a construction of a lens barrel unit of the digital still camera. FIG. 10 is a sectional view showing a construction of the digital still camera in a non-service state (a lens-retracted lens barrel condition). FIG. 11 is a sectional view showing the construction of the digital still camera in a service state (a lens-protruding lens barrel condition) at a wide angle (wide) position. FIG. 12 is a sectional view showing the construction of the digital still camera in the service state at a telescopic (tele) position.

Referring to FIGS. 9 to 12, a unit base member 1, which serves as a base of the lens barrel unit, is fixed to a camera main body (not shown). A fixed barrel 11 is fixed to a front end of the unit base member 1. A first lens holding barrel 3 holds a first lens unit 4. Three cam followers 6 having tapered tips are press-fitted into an outer peripheral surface of the first lens holding barrel 3. A cap 7 is fixed to an end of the first lens holding barrel 3 on an object side (hereinafter referred to also as front side) by adhesion.

A shutter unit 8 holds a second lens unit 9. A third lens holding barrel 14, which holds a third lens unit 15, is driven along a guide bar 16 in the optical axis direction by means of a focus motor 19 to focus.

An image pickup element 29, which is composed of a CCD sensor, a CMOS sensor, or the like, is fixed to a holding plate 30 fixed to the unit base member 1 by adhesion or the like.

A flexible substrate 31, which is connected to the image pickup element 29, supplies a signal processing circuit (not shown) with a signal outputted through photoelectric conversion in the image pickup element 29.

A dustproof rubber material 32 and a low pass filter (LPF) 33 are both fixed to the unit base member 1 by adhesion or the like.

A cam groove portion 11a (see FIGS. 10 to 12) is formed in an inner peripheral surface of the fixed barrel 11. A cam follower 10a, which is fixed to a movable cam barrel 10 by press-fitting, is engaged with the cam groove portion 11a. A gear portion 10d is so formed on an outer peripheral surface of the movable cam barrel 10 as to protrude radially outward (i.e., toward the fixed barrel 11 side). Rotation of a zoom motor 35 is decelerated and transmitted to the gear portion 10d through a gear train (not shown), so the movable cam barrel 10 is thereby rotationally driven around the optical axis. The rotating movable cam barrel 10 is driven in the optical axis direction as well due to an engagement operation of the cam follower 10a with the cam groove portion 11a formed in the fixed barrel 11.

In an outer peripheral surface of a finder cam plate 46, cam groove portions 46b and 46c for zoom-driving a finder lens (not shown) are formed in accordance with the zooming of the lens barrel unit. On an inner peripheral surface of the finder cam plate 46, a key portion 46a to be inserted into a through-groove portion 11d formed in the fixed barrel 11 is formed. The finder cam plate 46 can rotate around the optical axis along an outer peripheral surface of the fixed barrel 11.

The key portion 46a is engaged with protruding portions for transmitting rotation 10c, which is so formed on the outer peripheral surface of the movable cam barrel 10 as to protrude toward the fixed barrel 11 side.

A tension spring 47, which is fixed at one end thereof to the finder cam plate 46 and at the other end thereof to the fixed barrel 11, always biases the finder cam plate 46 toward the wide position.

Figure 4:
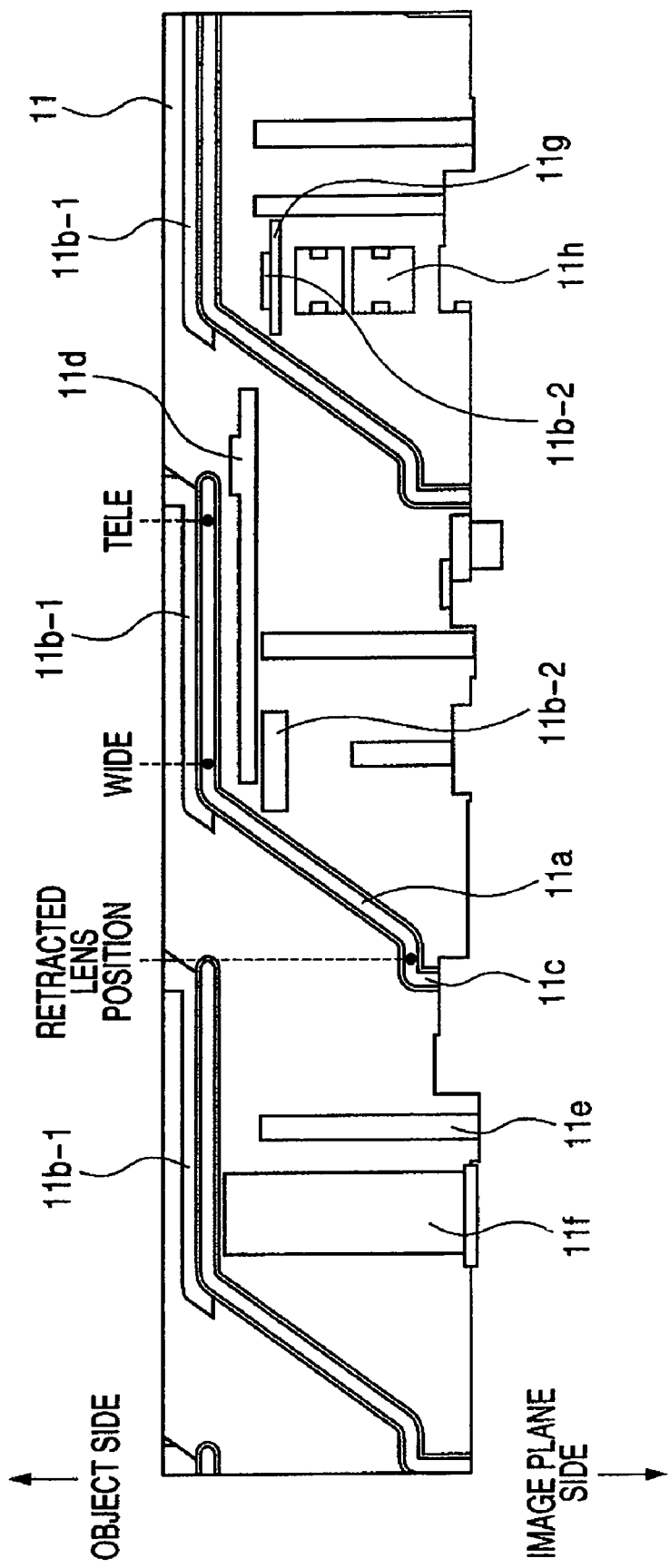
FIG. 4 is a developed view of the fixed barrel according to the embodiment of the present invention around the optical axis.

A straight-movable guide barrel 42 is provided inside the movable cam barrel 10. The movable cam barrel 10 can rotate with respect to the straight-movable guide barrel 42. A straight-movable key portion 42e (see FIG. 9) provided on the straight-movable guide barrel 42 is engaged with a straight-movable guide groove portion (denoted by 11e as shown in FIG. 4) provided in the fixed barrel 11. With this construction, the straight-movable guide barrel 42 is prevented from rotating with respect to the fixed barrel 11. Three guide protruding portions 42f provided at a front end of the straight-movable guide barrel 42 are engaged with a groove portion (not shown) provided in an inner peripheral surface of the movable cam barrel 10. Thus, the movable cam barrel 10 can rotate with respect to the straight-movable guide barrel 42. The straight-movable guide barrel 42 clamps the movable cam barrel 10 by means of a flange portion 42h provided at an end of the straight-movable guide barrel 42 on an image plane side and a press ring 45 provided at an end on the object side. Thus, the straight-movable guide barrel 42 and the movable cam barrel 10 move integrally in the optical axis direction.

The cam follower 6 provided on the outer peripheral surface of the first lens holding barrel 3 is engaged with the cam groove portion 10e formed in the inner peripheral surface of the movable cam barrel 10. A pin (not shown) provided on the outer peripheral surface of the first lens holding barrel 3 is engaged with a straight-movable guide groove portion 42a of the straight-movable guide barrel 42, thereby preventing the first lens holding barrel 3 from rotating. When the movable cam barrel 10 turns, the first lens holding barrel 3 is driven in the optical axis direction due to an engagement operation of the cam follower 6 with the cam groove portion 10e.

A cam follower 81 provided on an outer peripheral surface of the shutter unit 8 is engaged with a shutter cam groove portion 10h (see FIGS. 10 to 12) formed in the movable cam barrel 10 and a straight-movable guide groove portion 42b (see FIG. 9) formed in the straight-movable guide barrel 42. Thus, when the movable cam barrel 10 turns, the shutter unit 8 is driven in the optical axis direction due to an engagement operation of the cam follower 81 with the shutter cam groove portion 10h, while being prevented from rotating by means of the straight-movable guide groove portion 42b.

In the digital still camera constructed as described above, when an operating member (not shown) such as a main switch is operated in the non-service state shown in FIG. 10, the zoom motor 35 is actuated and then the movable cam barrel 10 rotates. As a result, the movable cam barrel 10 and the straight-movable guide barrel 42 move forward in the optical axis direction, and the first lens holding barrel 3 and the shutter unit 8 move forward in the optical axis direction due to rotation of the movable cam barrel 10. The focus motor 19 is also actuated at this moment. The third lens holding barrel 14 thereby moves forward. In this manner, a photographic optical system in the lens barrel unit is disposed in the service state (wide state) shown in FIG. 11.

Figure 1:
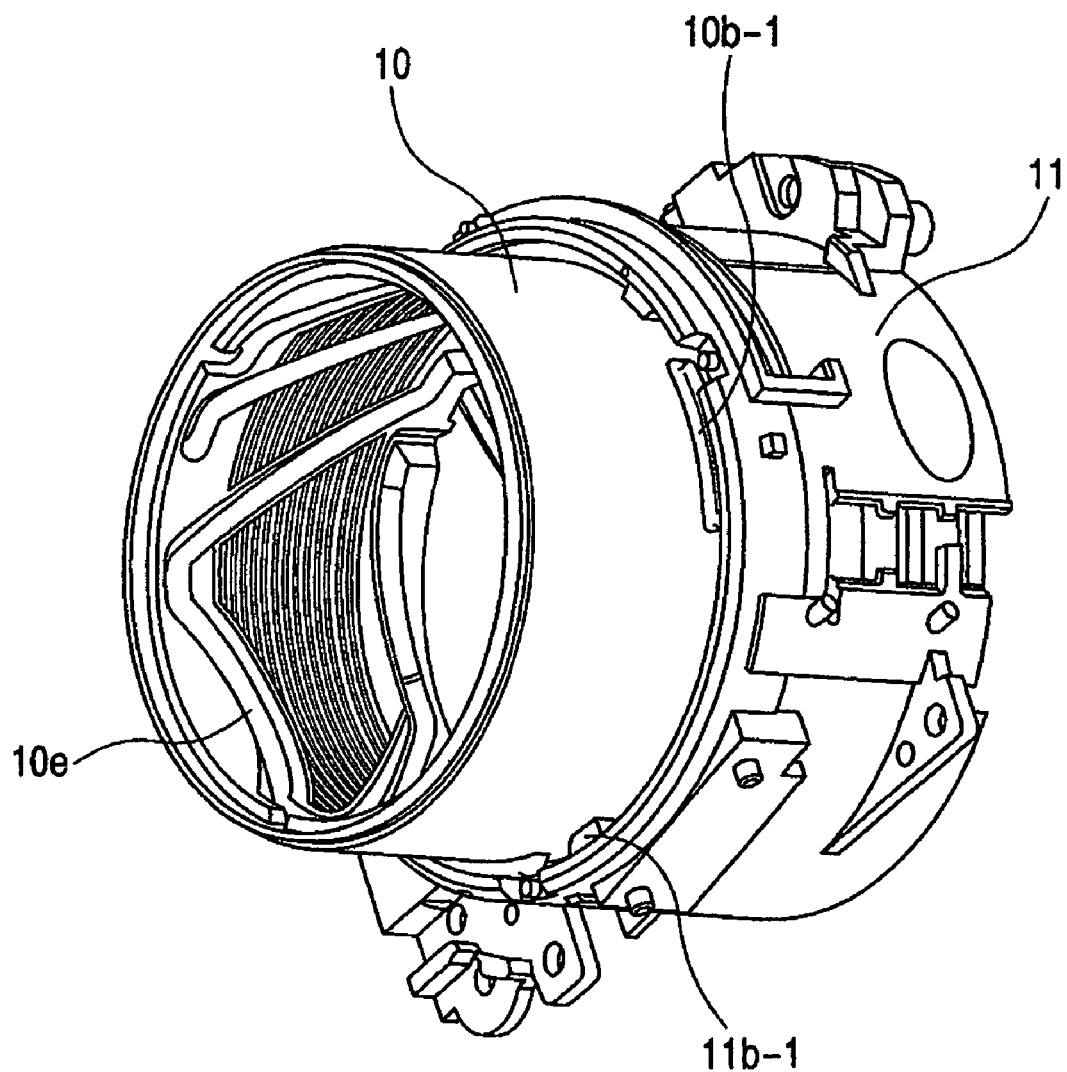
FIG. 1 is a perspective view showing a fixed barrel and a cam barrel constituting a lens barrel unit of a digital still camera according to an embodiment of the present invention, as viewed from an object side.
Figure 2:
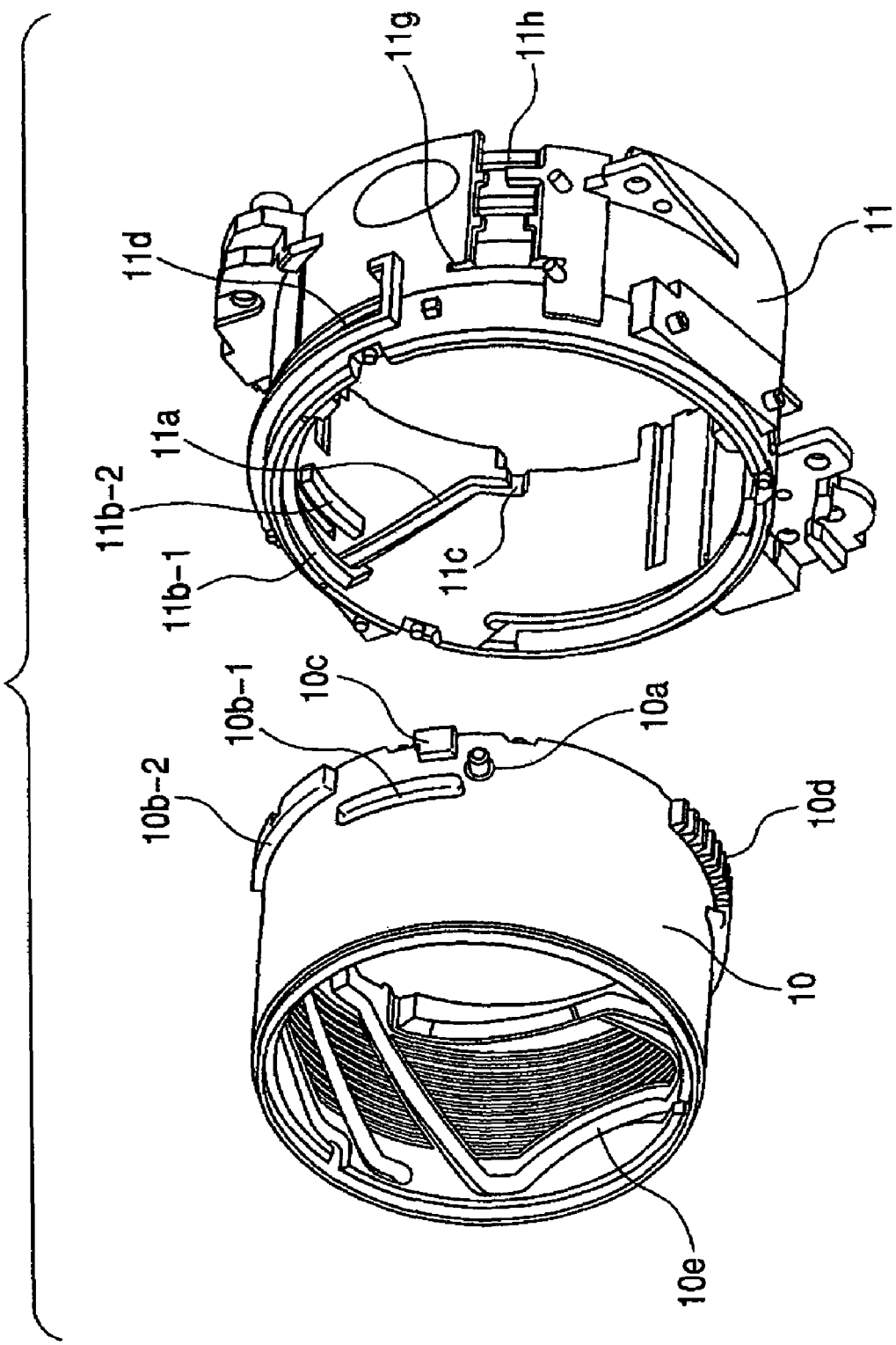
FIG. 2 is an exploded perspective view of the fixed barrel and the cam barrel according to the embodiment of the present invention.
Figure 3:
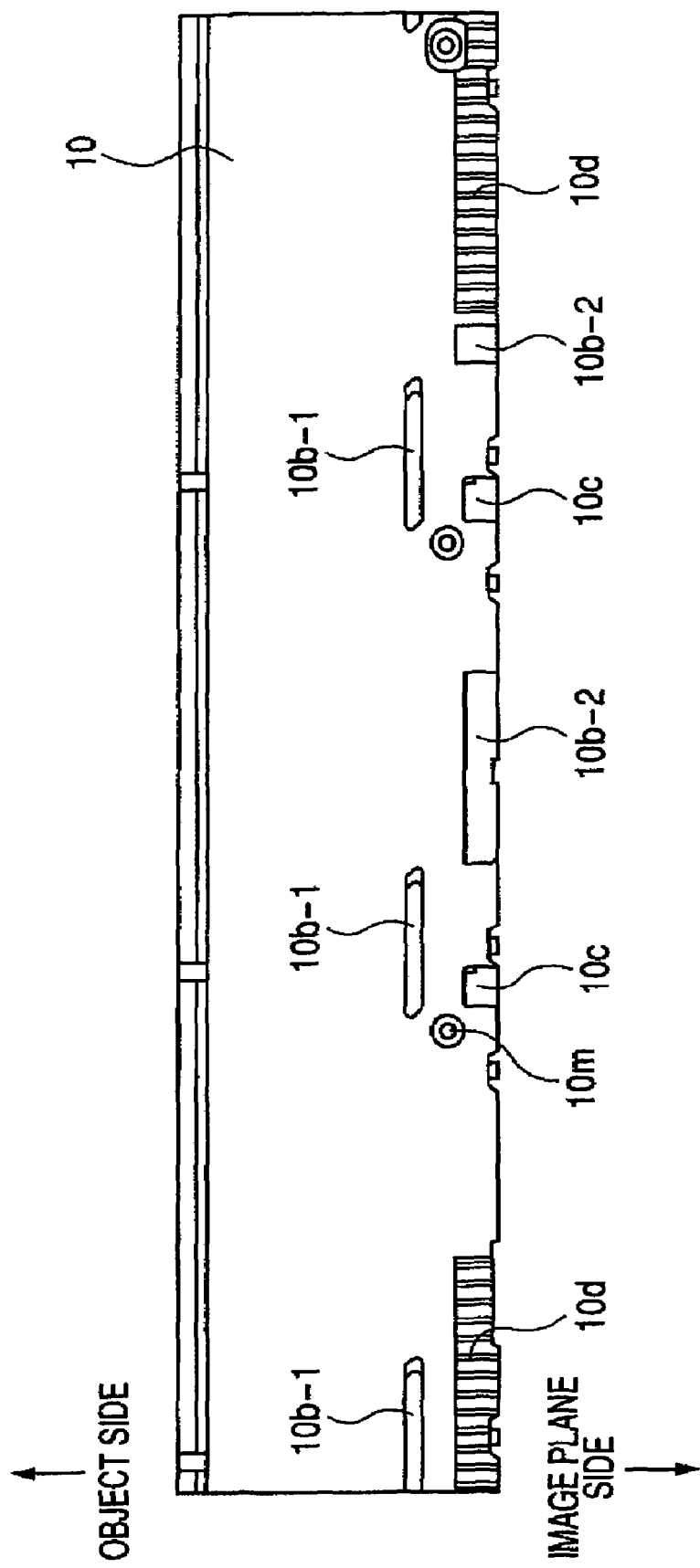
FIG. 3 is a developed view of the cam barrel according to the embodiment of the present invention around an optical axis.
Figure 5:
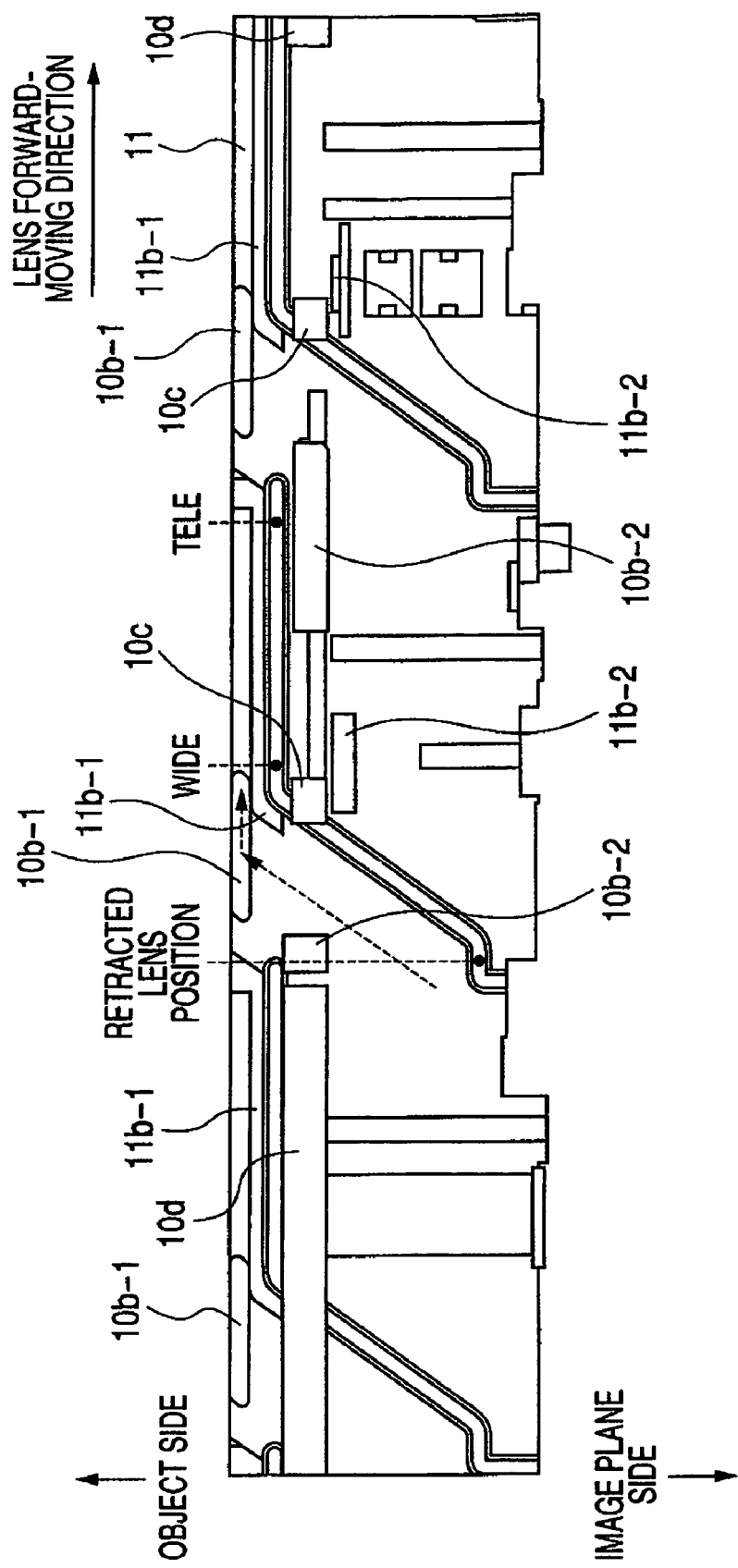
FIG. 5 is a developed view of the fixed barrel and the cam barrel according to the embodiment of the present invention around the optical axis (in a wide state)
Figure 6:
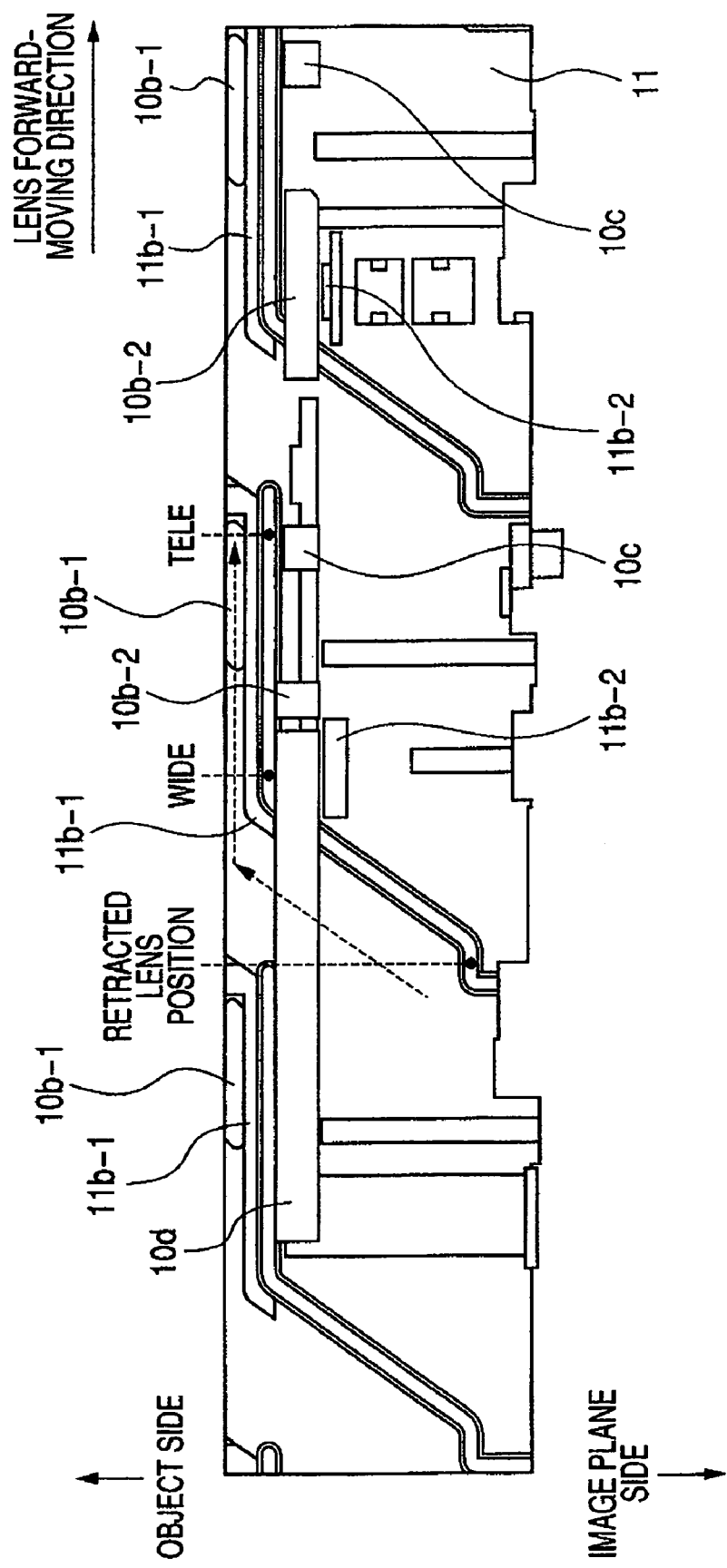
FIG. 6 is a developed view of the fixed barrel and the cam barrel according to the embodiment of the present invention around the optical axis (in a tele state)

FIGS. 1 to 6 each show a relationship between the fixed barrel 11 and the movable cam barrel (hereinafter referred to simply as cam barrel) 10 in the lens barrel unit. FIG. 1 is a perspective view of the fixed barrel 11 and the cam barrel 10 in an assembled state. FIG. 2 is an exploded perspective view of the fixed barrel 11 and the cam barrel 10. FIG. 3 is a developed view of the outer peripheral surface of the cam barrel 10 around the optical axis. FIG. 4 is a developed view of the inner peripheral surface of the fixed barrel 11 around the optical axis. Furthermore, FIGS. 5 and 6 are each a developed view of the fixed barrel 11 and the cam barrel 10 in the assembled state. While FIG. 5 shows the wide state, FIG. 6 shows the tele state. The relationship between the fixed barrel 11 and the cam barrel 10 will be described hereinafter in detail, including the same contents as in the foregoing description.

Referring to FIGS. 1 and 2, cam followers 10a, which are provided on the cam barrel 10 at three circumferential positions thereof, are engaged with the cam groove portion 11a formed in the inner peripheral surface of the fixed barrel 11. The cam barrel 10 rotates through transmission of a driving force from the above-described zoom motor 35 to the gear portion 10d, and is also driven in the optical axis direction due to the engagement operation of the cam followers 10a with the cam groove portion 11a.

A plurality of ribs 10b-1 as third protruding portions and a plurality of ribs 10b-2 as fourth protruding portions, which protrude radially outward (toward the fixed barrel 11 side), are provided on the outer peripheral surface of the cam barrel 10 at different positions in the optical axis direction. The ribs 10b-1 and 10b-2 are each provided at different positions (in different phases) in a circumferential direction.

On the other hand, a plurality of ribs 11b-1 as first protruding portions and a plurality of second protruding portions 11b-2 as second protruding portions, which protrude toward the cam barrel 10 side, are provided on the inner peripheral surface of the fixed barrel 11 at positions corresponding to the ribs 10b-1 and 10b-2 of the cam barrel 10 in the optical axis direction, respectively, that is, at different positions in the optical axis direction. The ribs 11b-2 are shorter than the ribs 11b-1 in the circumferential direction.

As described above, the gear portion 10d and the protruding portions 10c for transmitting rotation, which protrude toward the fixed barrel 11 side, are formed on the outer peripheral surface of the cam barrel 10. The gear portion 10d is designed to receive a driving force transmitted from the zoom motor 35. The protruding portions for transmitting rotation 10c are designed to rotate the finder cam plate 46 along the outer peripheral surface of the fixed barrel 11. The gear portion 10d and the protruding portions 10c for transmitting rotation are also included in the fourth protruding portions. When the cam barrel 10 is about to further rotate in a tele direction from the tele state and to further rotate in a lens retracting direction from the retracted lens state, the protruding portions for transmitting rotation 10c comes into abutment on a circumferential end of the groove portion 11d formed in the fixed barrel 11 together with the key portion 46a of the finder cam plate 46, thereby playing a role of restricting the rotation of the cam barrel 10 as well.

The cam barrel 10 is mounted into the fixed barrel 11 by adjusting the phase of a mounting mark provided on the cam barrel 10 to a mark provided on the fixed barrel 11, inserting the cam followers 10a of the cam barrel 10 into an introduction portion 11c formed at the end of the cam groove portion 11a of the fixed barrel 11 on the image plane side, and then pressing the cam barrel 10 toward the object side.

As shown in FIG. 3, the two ribs 10b-2, the gear portion 10d, and protruding portions 10c for transmitting rotation are formed in mutually different phases at the end of the outer peripheral surface of the cam barrel 10 on the image plane side. End faces of the ribs 10*b*-2, the gear portion 10*d*, and the protruding portions 10*c* for transmitting rotation as the fourth protruding portions on the image plane side are located at substantially the same position in the optical axis direction.

The ribs 10*b*-1 are arranged at equal intervals in three positions located on the object side with respect to the ribs 10*b*-2, the gear portion 10*d*, and the protruding portions 10*c* for transmitting rotation. While the protruding portions 10*c* for transmitting rotation overlap in phase with two of the three ribs 10*b*-1 respectively, the ribs 10*b*-2 are different in phase from any one of the ribs 10*b*-1. The gear portion 10*d* includes a phase of one of the three ribs 10*b*-1 and extends to a phase different from any one of the three ribs 10*b*-1. Referring to FIG. 3, a hole portion 10*m* is provided to press-fit the cam follower 10*a* thereinto.

The cam groove portion 11*a* provided in the inner peripheral surface of the fixed barrel 11 shown in FIG. 4 obliquely extends from the retracted lens position to the wide position at a predetermined lift angle with respect to the optical axis direction, and then to the tele position at the same position in the optical axis direction. Thus, the cam barrel 10 having the cam followers 10*a* engaged with the cam groove portion 11*a* moves toward the object side while rotating from the retracted lens position to the wide position with respect to the fixed barrel 11, and rotates at a certain position in the optical axis direction from the wide position to the tele position.

Three ribs 11*b*-1, which are arranged at equal intervals of in the vicinity of the end of the inner peripheral surface of the fixed barrel 11 on the object side and at positions located on the object side with respect to the cam groove portions 11*a*, in such a manner as to extend along a region from a position located slightly on the retracted lens side with respect to the wide position to the tele position in each of the three cam groove portions 11*a*.

The ribs 11*b*-2 are provided at two positions in the circumferential direction on the image plane side with respect to the cam groove portions 11*a*. The two ribs 11*b*-2 are each formed in a phase range from a position of each of the two cam groove portions 11*a*, which corresponds to the wide position, to a position slightly advanced therefrom toward the retracted lens side or the tele side.

As described above, the through-groove portion 11*d* shown in FIG. 4 is provided to insert the key portion 46*a* thereinto. The key portion 46*a* is provided on the finder cam plate 46. The protruding portions for transmitting rotation 10*c*, which is provided on the cam barrel 10, is engaged with the through-groove portion 11*d*. A straight-movable guide groove portion 11*e* engages with the straight-movable key portion 42*e* of the above-described straight-movable guide barrel 42, and guides the straight-movable guide barrel 42 in the optical axis direction. In addition, a notched portion 11*f* is provided to insert thereinto a gear (not shown) to be engaged with the gear portion 10*d* of the cam barrel 10. A substrate holding portion 11*h* holds a flexible substrate, which will be described later, on the outer peripheral surface side of the fixed barrel 11. A through-hole 11*g* is provided to pass the flexible substrate held by the substrate holding portion 11*h* through inside the fixed barrel 11.

When the cam barrel 10 formed as described above is mounted inside the fixed barrel 11, positional relationships among the ribs 10*b*-1 and 10*b*-2 of the cam barrel 10, the protruding portions 10*c* for transmitting rotation, the gear portion 10*d*, and the ribs 11*b*-1 and 11*b*-2 of the fixed barrel 11 are as shown in FIGS. 5 and 6 in the wide state and the tele state, respectively.

In the wide state shown in FIG. 5, when an external force is applied to the cam barrel 10 from the object side, the ribs 10*b*-1 of the cam barrel 10 on the object side partially come into abutment on the ribs 11*b*-1 of the fixed barrel 11 on the object side. At this moment, the protruding portions 10*c* for transmitting rotation come into abutment on the two ribs 11*b*-2 of the fixed barrel 11 on the image plane side. It is thus possible to enlarge an area for receiving the external force (abutment area) in comparison with a case where only the ribs 10*b*-1 of the cam barrel 10 come into abutment on the ribs 11*b*-1 of the fixed barrel 11. As a result, the cam followers 10*a* can be prevented from being disengaged from the cam groove portions 11*a*.

In the tele state shown in FIG. 6, when an external force is applied to the cam barrel 10 from the object side, the ribs 10*b*-1 of the cam barrel 10 on the object side entirely come into abutment on the ribs 11*b*-1 of the fixed barrel 11 on the object side. If the external force has a normal magnitude, it can be sufficiently absorbed through this abutment. In the embodiment of the present invention, furthermore, the gear portion 10*d* of the cam barrel 10 comes into abutment on one of the two ribs 11*b*-2 of the fixed barrel 11 on the image plane side, and the rib 10*b*-2 comes into abutment on the other rib 11*b*-2. It is thus possible to further enlarge an area for receiving an external force (abutment area). As a result, the cam followers 10*a* can be prevented from being disengaged from the cam groove portions 11*a* respectively even when a larger external force is applied to the cam barrel 10.

In the tele state, the position where each of the ribs 10*b*-1 abuts on a corresponding one of the ribs 11*b*-1 is different in phase from the position where the gear portion 10*d* or the rib 10*b*-2 abuts on the rib 11*b*-2. In the tele state, therefore, the lens barrel can be reinforced almost along the entire circumference thereof by adjusting each front one of the ribs to a corresponding rear one of the ribs.

In a middle region between the wide position and the tele position, when an external force is applied to the cam barrel 10 from the object side, those ones of the ribs 10*b*-2 of the cam barrel 10, the protruding portions 10*c* for transmitting rotation, and the gear portion 10*d* which correspond to a zoom position come into abutment on the ribs 11*b*-2 of the fixed barrel 11 on the image plane side. Thus, at any zoom position, the cam barrel 10 abuts on the fixed barrel 11 at a plurality of longitudinal locations in the optical axis direction, so a sufficient abutment area is ensured. As a result, the cam followers 10*a* can be prevented from being disengaged from the cam groove portions 11*a*.

The following restrictions are imposed on the phases of the ribs 11*b*-2 provided on the fixed barrel 11 on the image plane side when a plurality of protruding portions are provided at different positions in the optical axis direction as in the case of the embodiment of the present invention. That is, when the cam barrel 10 moves with respect to the fixed barrel 11 between the retracted lens position and the wide position, the protruding portions such as the ribs 10*b*-1 and 10*b*-2 of the cam barrel 10, the protruding portions 10*c* for transmitting rotation, and the gear portion 10*d* also move in a direction extending along the cam groove portions 11*a* of the fixed barrel 11. Thus, the ribs 11*b*-2 of the fixed barrel 11 need to be disposed outside moving regions of the protruding portions of the cam barrel 10, which move between the retracted lens position and the wide position, so as not to interfere with the protruding portions.

The amounts of engagement (abutment length) of the ribs 10b-1 provided on the cam barrel 10 with the ribs 11b-1 provided on the fixed barrel 11 are small in the wide state. As described above, according to the embodiment of the present invention, even in such a wide state, the strength against an external force in the entire zoom region can be uniformized and enhanced without increasing the diameter of the fixed barrel 11 or the cam barrel 10, because the amounts of engagement of the gear portion 10d and the protruding portions 10c for transmitting rotation with the ribs 11b-2 provided on the fixed barrel 11 on the image plane side with respect to the ribs 11b-1 can be added. Besides, since the conventionally provided protruding portions are utilized as the gear portion 10d and the protruding portions 10c for transmitting rotation, the number of the ribs 10b-2 provided newly for the sole purpose of receiving an external force can be made small.

Figure 7B:
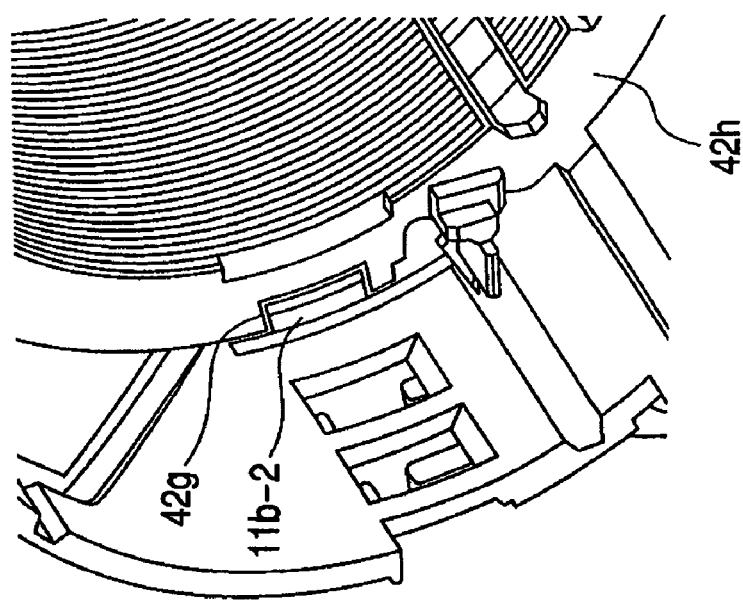
FIGS. 7A and 7B are each a perspective view of the lens barrel unit according to the embodiment of the present invention, as viewed from an image plane side.
Figure 7A:
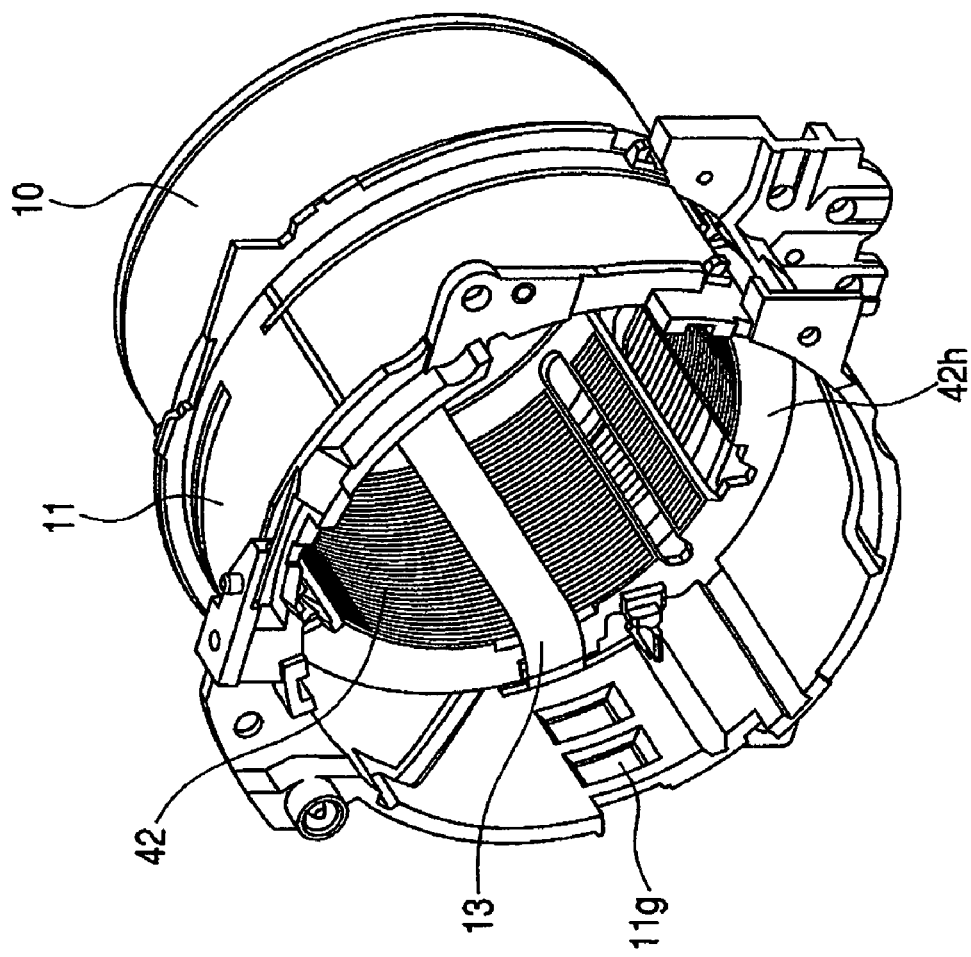
Figure 8:
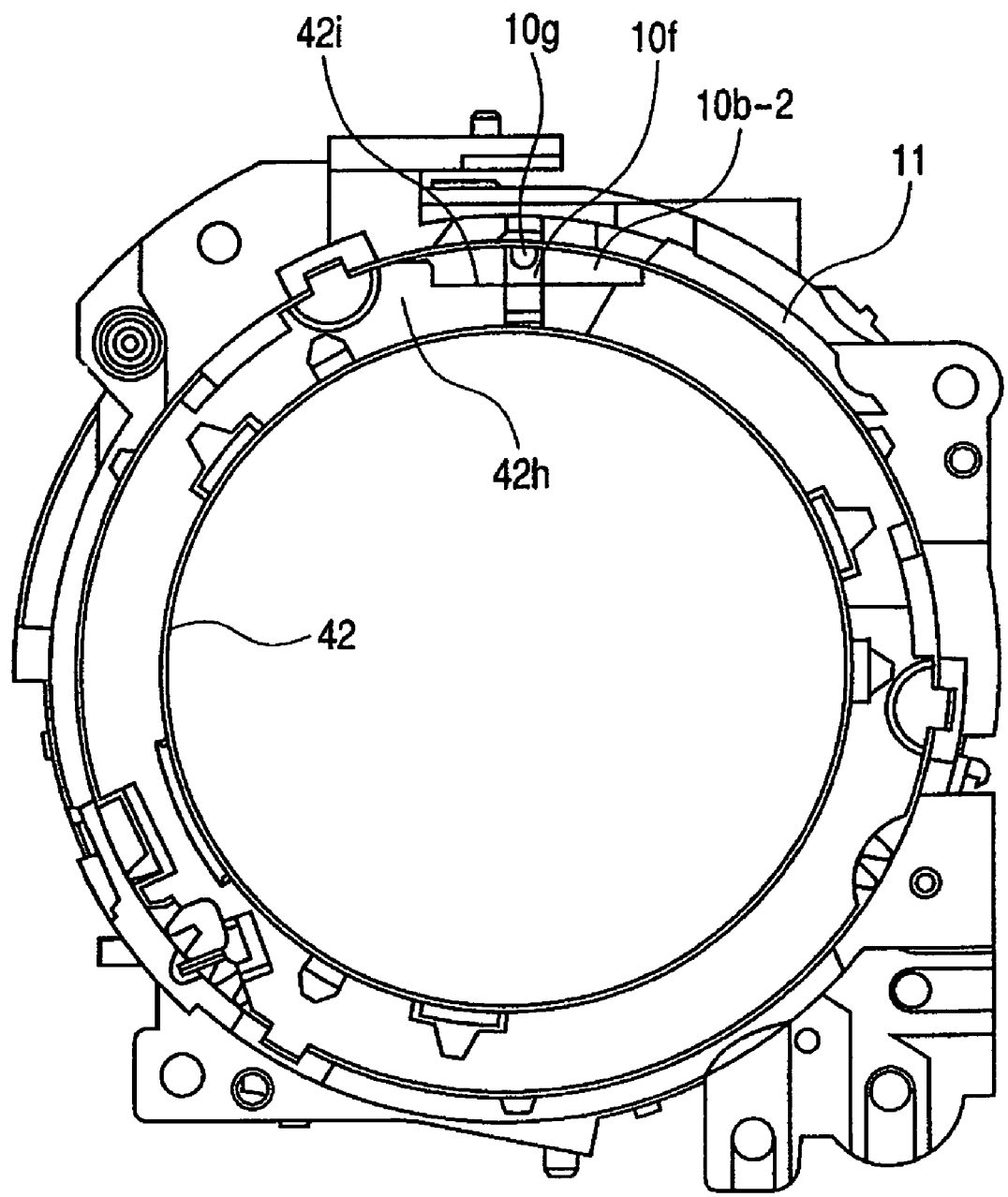
FIG. 8 is a view of the lens barrel unit according to the embodiment of the present invention, as viewed from the image plane side.

In the embodiment of the present invention, as shown in FIGS. 7A, 7B, and 8, the ribs 10b-2 provided on the fixed barrel 11 are also used for purposes other than the purpose of receiving the external force, in consideration of the fact that the ribs 11b-2 protrude radially inward from the inner peripheral surface of the fixed barrel 11.

Referring to FIGS. 7A and 7B, a flexible substrate 13 for supplying the straight-movable guide barrel 42 and the shutter unit 8 with electricity is held on the outer peripheral surface side of the fixed barrel 11 by means of the substrate holding portion 11h formed on the fixed barrel 11, is guided to inside the fixed barrel 11 through the through-hole 11g, and extends to the object side.

A notched portion 42g for passing the flexible substrate 13 therethrough during the retraction of the lens is formed in the flange portion 42h of the straight-movable guide barrel 42. In order to ensure a light blocking characteristic, it is desirable that no gap be left between the inner peripheral surface of the fixed barrel 10 and an outer peripheral surface of the flange portion 42h of the straight-movable barrel 42. In the embodiment of the present invention, therefore, the notched portion 42g is closed by the rib 11b-2 of the fixed barrel 11 on the image plane side in the service state in the zoom region between the wide state and the tele state. Thus, a light blocking characteristic is ensured at the time of photographing even if the flexible substrate 13 is disposed as described above.

As shown in FIG. 8, a mark 10f, which is visually easily recognizable in constructing the lens barrel unit, is provided on a surface of the rib 10b-2 on the image plane side in the direction of 12 o'clock (0 o'clock). The cam barrel 10, the fixed barrel 11, and the straight-movable guide barrel 42 can be easily assembled by being oriented in the direction of 12 o'clock, using the mark 10f as a reference.

Referring to FIG. 8, a hole portion 10g is formed in the rib 10b-2 so as to catch a tool such as a pair of tweezers therein when it has become necessary to manually rotate the cam barrel 10 with respect to the fixed barrel 11 during assembly to move the cam barrel 10 in the optical axis direction. A notched portion 42i is formed in the flange portion 42h of the straight-movable guide barrel 42 at a position around the hole portion 10g so as to ensure a moving space of the tool. As described above, the light blocking characteristic deteriorates if the notched portion 42i is provided in the flange portion 42h of the straight-movable guide barrel 42. Thus, as is the case with the notched portion 42g for the flexible substrate 13, the notched portion 42i is also closed by the ribs 11b-2 provided on the fixed barrel 11 in the service state.

In this embodiment, the protruding portions provided on the fixed barrel 11 and the cam barrel 10 are brought into abutment on each other at two positions in the optical axis direction. In the present invention, however, the number of such positions is not limited to two, it may be three or more.

In this embodiment, the gear portion 10d is provided on the cam barrel 10, and the ribs 10b-2 are provided thereon at two positions. However, ribs 10b-2 can also be disposed in a well-balanced manner at three positions arranged at equal intervals when a rotational force can be transmitted to the cam barrel 10 by means of another mechanism.

In this embodiment, the cam followers 10a provided on the cam barrel 10 are engaged with the cam groove portions 11a provided on the fixed barrel 11. The present invention is also applicable to a case where cam followers are engaged with protruding strip cams.

Further, in the embodiment of the present invention described above, the cam portion is the fixed barrel 11 as the first member and the cam follower portion provided on the cam barrel 10 as the second member. The present invention is also applicable to a case where the cam portion is provided on the second member and the cam follower portion is provided on the first member.

In the embodiment of the present invention described above, the present invention is applied to the lens barrel of the digital still camera. The present invention is also applicable to a lens barrel of a video camera or an interchangeable lens of a single lens reflex camera.

This application claims priority from Japanese Patent Application No. 2005-039715 filed on Feb. 16, 2005, which is hereby incorporated by reference herein.

What is claimed is:

1. An optical apparatus comprising:
   a first member; and
   a second member for rotating around an optical axis with respect to the first member, wherein:
   one of the first member and the second member has a cam portion;
   the other of the first member and the second member has a cam follower portion for being engaged with the cam portion;
   the cam portion drives the first member and the second member relatively to each other in an optical axis direction through relative rotation of the first member and the second member;
   the first member has first protruding portions and second protruding portions which protrude toward the second member side at positions separate from each other in the optical axis direction;
   the second member has third protruding portions and fourth protruding portions which protrude toward the first member side at positions separate from the first protruding portions and the second protruding portions in the optical axis direction, and can abut on the first protruding portions and the second protruding portions in the optical axis direction, respectively; and
   the fourth protruding portions are provided in a circumferential direction of the second member and include protruding portions for transmitting a power.

2. An optical apparatus according to claim 1, wherein the second protruding portions can abut on the fourth protruding portions when at least the first member and the second member are located at relative rotational positions so that a portion of the third protruding portions which is shorter than an entire length of the third protruding portions in the circumferential direction can abut on the first protruding portions.

3. An optical apparatus according to claim 1, wherein object side surfaces of the first protruding portions and the second protruding portions can abut on image plane side surfaces of the third protruding portions and the fourth protruding portions, respectively, when the second member has been driven toward the object side with respect to the first member.

4. An optical apparatus according to claim 1, wherein the fourth protruding portions include a gear portion for receiving a driving force for rotationally driving the second member.

5. An optical apparatus according to claim 1, wherein the fourth protruding portions include protruding portions for transmitting rotation of the second member to another member.

6. An optical apparatus according to claim 1, wherein:
the cam portion is formed so that the cam portion drives the first member and the second member relatively to each other in the optical axis direction when the first member and the second member rotate relatively to each other in a first rotational range, and stops driving the first member and the second member relatively to each other in the optical axis direction when the first member and the second member rotate relatively to each other in a second rotational range; and
the first protruding portions and the second protruding portions can abut on the third protruding portions and the fourth protruding portions, respectively, when the first member and the second member are in the second rotational range.

7. An optical apparatus according to claim 1, wherein the first protruding portions and the second protruding portions are provided outside moving ranges of the third protruding portions and the fourth protruding portions, respectively, at a time when the second member is driven with respect to the first member in the optical axis direction.

8. An optical apparatus according to claim 1, wherein the second protruding portions close an opening formed in another member that is adjacent to the first member in a direction perpendicular to the optical axis.

9. An optical apparatus comprising:
a first member; and
a second member for rotating around an optical axis with respect to the first member, wherein:
one of the first member and the second member has a cam portion;
the other of the first member and the second member has a cam follower portion for being engaged with the cam portion;
the cam portion drives the first member and the second member relatively to each other in the optical axis direction through relative rotation of the first member and the second member;
the first member is provided with protruding portions for the first member which protrudes toward the second member side;
the second member is provided with protruding portions for the second member which protrude toward the first member side and can abut on the protruding portions for the first member from the optical axis direction; and
the protruding portions for the second member are provided in a circumferential direction of the second member and include protruding portions for transmitting power,
positions of the protruding portions for the first member and positions of the protruding portions for the second member are reversed in the optical axis direction depending on a range of the relative rotation.

10. An optical apparatus according to claim 9, further comprising a photoelectric conversion element for performing photoelectric conversion of an object image formed by an optical system including a lens.

* * * * *